Dec. 8, 1959 S. HELD 2,916,641
ELECTRICALLY MAINTAINED BALANCE WHEEL
Filed Aug. 20, 1956 2 Sheets-Sheet 1
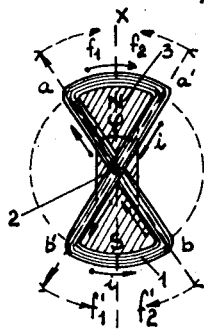
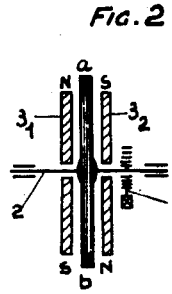
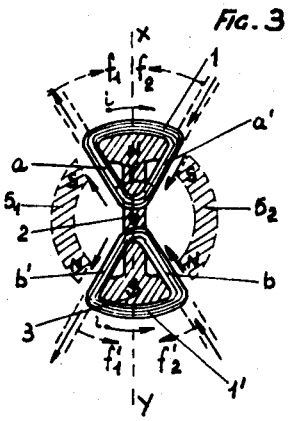
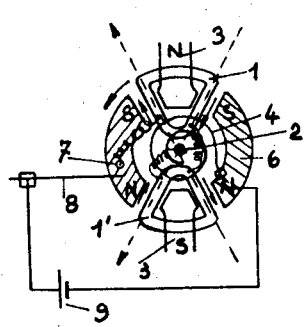
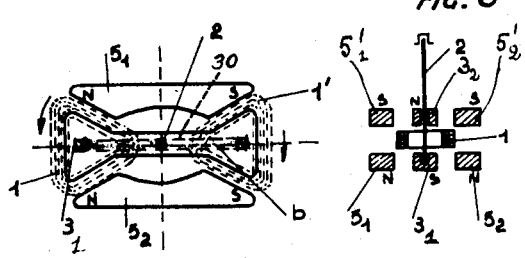
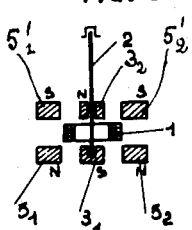
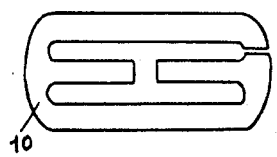
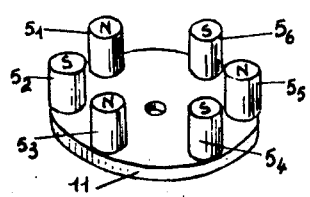
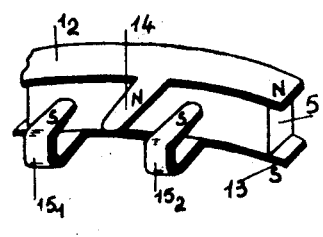
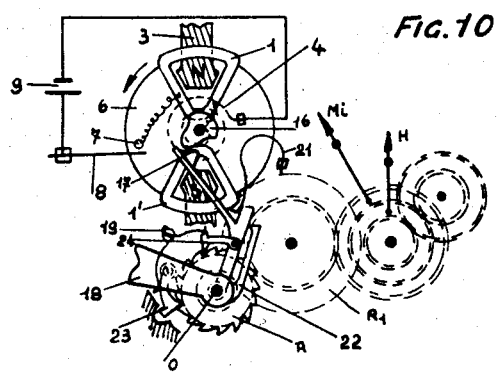
INVENTOR:
SERGE HELD
BY: *signature*
ATTORNEYS.

Dec. 8, 1959 S. HELD 2,916,641
ELECTRICALLY MAINTAINED BALANCE WHEEL
Filed Aug. 20, 1956 2 Sheets-Sheet 2

INVENTOR:
SERGE HELD
BY: Moore & Hall
ATTORNEYS.

United States Patent Office 2,916,641
Patented Dec. 8, 1959

2,916,641

ELECTRICALLY MAINTAINED BALANCE WHEEL

Serge Held, Geneva, Switzerland

Application August 20, 1956, Serial No. 605,009

Claims priority, application France August 23, 1955

11 Claims. (Cl. 310—39)

The object of this invention is an electrically maintained balance wheel for governing the escapement of a watch or clock.

A more particular object of the invention is a balance wheel carrying one of the two parts of a magneto-electric motor, namely a permanent magnet and a coil of the form of a figure of eight or its equivalent.

A further particular object of the invention is a small magneto-electric motor consisting of triangular windings moving in the field of fixed magnets, and serving to drive a clockwork or watch of the type having a balance wheel and spiral spring as commonly used in watches. The windings are held in a non-metallic support which constitutes the balance wheel proper, the oscillations of which are maintained by electro-motive pulses produced at the instant when the balance wheel passes its equilibrium position and closes a contact. The contact is closed between a stud on the balance wheel and a flexible conductor mounted in such a position beside the balance wheel that the stud abuts upon it when the torque of its spring is zero. The contact completes the circuit of a battery and the windings, so producing a torque always directed to drive the balance wheel in the direction in which it is moving, the current never changing direction. The flexible conductor fixed, for example, to the plate of a watch remains in contact with the moving stud through an angle of movement of about 40°, and the contact is then broken, the flexible conductor returns to its position of rest and the balance wheel, now entirely free, continues oscillating, returns through the position of equilibrium, makes contact and receives a fresh impulse in the opposite sense to the first. During the time of contact the balance wheel steps forward by a tooth or half a tooth an escapement wheel from which the hands of the watch are driven through reduction gearing.

It is essential to the proper working of the invention that the windings and magnets should be of suitable shape, and that the sign or direction of the magnetic flux of the magnet and of the flux due to the windings shall be appropriate to the relative position of the parts of the motor at the instants when contact is made and broken, so that, without reversal of the current, motive pulses of opposite direction are obtained, each in the direction in which the balance wheel is moving when the pulse occurs; and the aim should be to obtain maximum torque with minimum current consumption and high efficiency.

A further object of the invention is a motor which can be enclosed in a very flat casing such as a watch case.

It is characteristic of the motor of the invention that its windings have the form of a figure of eight, and so include two bundles of conductors which cross one another and form a very flat rotor which can oscillate freely in the airgap of two tapered bar magnets, the poles of which are substantially triangular in form. The direction of flow of current in the windings is such that the flux due to it within the two surfaces circumscribed by the conductors is opposite in direction to the magnetic flux of the magnet poles.

In the accompanying drawings:

Fig. 1 is an elevation; and

Fig. 2 a section on a plane containing the axis of rotation, of a magnet and figure of eight winding illustrating the principle of the invention, the parts being in a position of unstable equilibrium at the instant of contact making when they receive a motive pulse in the direction of swing;

Fig. 3 shows a practical arrangement of the motor diagrammatically shown in Fig. 1, with an addition which increases the couple and the efficiency;

Fig. 4 shows the electrical connections;

Fig. 5 is an elevation; and

Figure 11:
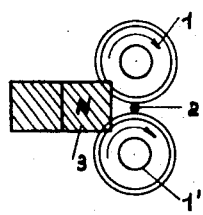
Figure 12:
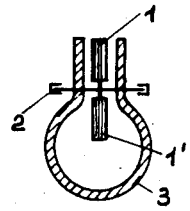
Figure 13:
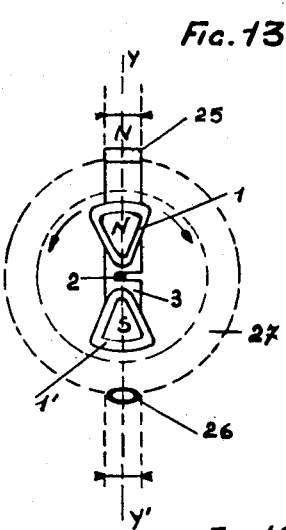
Figure 14:
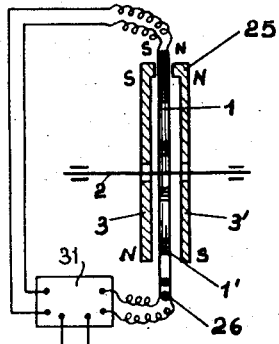
Figure 15:
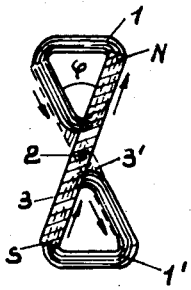
Figure 16:
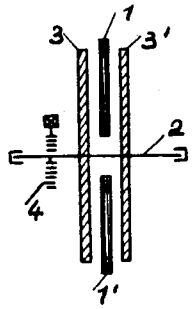
Figure 17:
Figure 18:
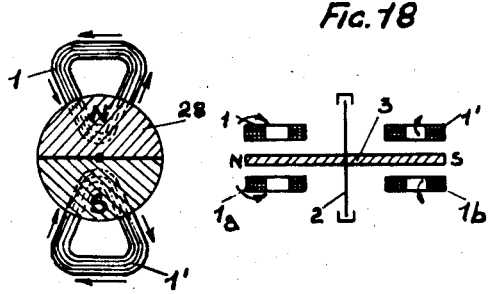

Fig. 6 a section on a plane through the axis of rotation of a modification of Fig. 3 including means of temperature compensation;

Fig. 7 shows one integer of the magnetic circuit of Fig. 5 when three magnets and a soft iron armature are used;

Fig. 8 is a modification of the magnetic circuit, using small magnets the polar axes of which are perpendicular to the surface of the balance wheel and therefore to the surface of the windings;

Fig. 9 is a modification in which, in lieu of separate magnets, giving a multi-polar construction, an annular magnet is used the polar axis of which is parallel to the generators of the cylindrical surface, that is to say the two faces which are annuli are respectively the north and south poles, and upon them are flat armatures of soft iron with claws which give substantially the same flux distribution as the multipolar arrangement;

Fig. 10 shows diagrammatically by way of example the complete movement for a pawl and ratchet escapement, though other forms of drive transmission may be used without changing the principle of the invention;

Fig. 11 and Fig. 12 are respectively an elevation and section of another type of construction where the magnet poles are outside the windings;

Fig. 13 and Fig. 14 are respectively an elevation and section on a plane containing the axis of rotation of an improved construction which allows of amplitude regulation;

Figs. 15 and 16 are similar views of modification with fixed windings and moving magnets;

Fig. 17 is a modification in which the moving magnet is a disc of which the two halves separated by a diametral line are magnetised north and south respectively, and face two fixed triangular windings;

Fig. 18 is a modification in which the moving magnet lies between two pairs of fixed coils.

In Fig. 1 the continuous winding is in the form of an elongated figure of eight 1. The magnet $3_1$ is in the form of a plate with trapezoidal ends magnetised north and south respectively, and lies below the winding. The magnet circuit is closed by a second magnet $3_2$ (Fig. 2) located above the winding, and the poles of this are of opposite sign to the adjacent poles of magnet $3_1$. Alternatively the magnet circuit may be closed by a plate of soft iron. For the arrangement described and the polarities shown the direction of the current will be as indicated by the arrows. The symmetrical position indicated by the axis X—Y is that at which the spiral spring is unstressed, and is also the position at the instant when contact is made as shown in the diagram of connections Fig. 4. The parts of the conductors $ab$, $a'b'$ which form two flat bundles of wires crossing at an angle of about 90° slightly overlap the polar faces, and are subject, in accordance with Laplace's law, to equal and opposite electromagnetic forces $f_1f_2$ and $f'_1f'_2$. Since the balance wheel has some momentum it passes the axis X—Y which is a dead point, so that one of the flat bundles $ab$ or $a'b'$ enters the airgap and according to its direction of swing the balance wheel is subjected to a torque $f_1f_2'$ or $f'_1f_2$, the torque always tending to turn the balance wheel in the direction in which it is turning. In other words, the magnetic flux of the poles being opposite in direction to the magnetic flux due to the ampere-turns of the winding, the winding tends to move to a region where the magnetic flux is least, the position of stable equilibrium being at right angles to the polar axis NS.

The motive effect can be doubled by placing poles of opposite sign on the two sides of the winding, for then, for a given direction of swing, the two bundles $ab$ and $a'b'$ are simultaneously operative, while with a two-pole magnet, as in Fig. 1, the two bundles of conductors become operative alternately. This modification is shown in Fig. 3, where the added poles $5_1$, $5_2$ are shown dotted. In practice, to avoid the overlap of the two bundles of wires at the middle, the winding is built of two triangular coils as in Fig. 3. Since the bundle $a'$ is in fact a continuation of the bundle $b'$ and $a$ of $b$, and the direction of current flow and of flux in the poles being the same as in Fig. 1, Fig. 3 operates exactly as does Fig. 1. It can still be said that in the symmetrical position each winding tends to move away from the two poles whose fluxes are opposite and towards the two poles whose fluxes are in the same direction. While contact lasts there is repulsion and attraction for oscillation in the one direction, and so there is for oscillation in the opposite direction, and the forces thus created are necessarily in the same direction as the force on the balance wheel provided the currents are in the right direction with respect to the adjacent poles.

Fig. 4 explains diagrammatically the electrical connections. Since the windings are in series one terminal is connected to the shaft 2 and thus to the spiral spring anchored to the frame, and the other terminal to the stud 7 which is insulated from the clockwork, and which can make contact with the flexible blade 8 connected to one pole of the source of direct current 9, the other pole of which is connected to the frame.

Fig. 5 is a modification of Fig. 3, in which there are two windings 1 and 1' framing the two repellent poles of the central magnet 3 and framed by the attracting poles of the magnets $5_1$ and $5_2$. A small bar 30 shown in dotted lines on Fig. 5 or a wire of an alloy at its Curie point, may be arranged upon the face of the magnet 3 so as to form a magnetic shunt to compensate for the effect of temperature rises. The magnetic circuit is completed by three identical magnets $3_2$, $5'_1$ and $5'_2$ exactly superposed on those already mentioned with a narrow airgap in which the windings 1 and 1' move the windings being flat triangular coils which constitute the balance wheel as shown in Fig. 6. One group of three magnets could be replaced by a plate of soft iron (10, Fig. 7) with suitable openings in it, to delimit the polar flux and with a passage in the middle for the spindle which is carried in two bearings, one of them recessed in the central magnet; alternatively the spindle may pass through a hole in the magnet. The windings may be of other shape, for instance circular; the preferred form is that of two triangles forming a figure of eight (Fig. 1), for the forces being then at right angles the torque is a maximum.

Fig. 8 shows an improvement developed from Figs. 3 and 5, and it can be seen at once that the distribution of poles is the same, there being a north pole between two south poles, and a south pole between two north poles; the difference between Figures 5 and 8 is that in the former the polar axis, north-south for example, is parallel to the surface of the windings, while in the latter the polar axes have the same direction as the flux which traverses the windings and gives rise to motive force. This construction tends to greater effectiveness, for in many modern magnets the preferred axis of flux is the polar axis, so that the polar surfaces of these special magnets can be directly used without any soft iron pole pieces. By way of example there are shown in Fig. 8 six small cylindrical magnets, $5_1$—$5_2$ and $5_3$ on the one hand and $5_4$—$5_5$ and $5_6$ on the other hand. A plate of soft iron 11 joins the poles which are opposite to those above which the windings move, to reduce stray flux, for with these magnets of high coercivity, such as Ticonal, Nialco, Fercolite etc. the flux in the direction of the polar axes suffers but little weakening in a region relatively distant from the polar faces and in practice it is useless to close the magnetic circuit with a piece of soft iron unless this can serve also as a magnetic screen between the motor and neighbouring mechanism. For triangular windings the magnets will naturally be of triangular section. It is contemplated that in the arrangement of Fig. 8 where the magnetic circuit includes six small separate magnets with their axes parallel to the spindle of the balance wheel, it may suffice to have two only of these magnets on the same diameter, that is to say $5_1$—$5_4$, or $5_7$—$5_5$, or $5_3$—$5_6$, and these may be circular or triangular in section, the parts which form the balance wheel being mounted as in Fig. 4 when the magnets 6 and 7 are omitted.

Fig. 9 shows a construction in which, in lieu of six little separate magnets, a single magnet of annular form is employed, of which only a fragment is shown to keep the drawing clear. The magnet proper is 5, of an alloy of high coercivity, magnetised so that its plane faces are north and south respectively. To these faces are applied two annuli of thin soft iron by which the flux can be directed to a useful region, and for that purpose the annuli are stamped with tongues which, or some of them, can then be doubled over to form poles of alternate polarity as indicated in Fig. 9; the practical result as regards the magnetic field is the same as is obtained with Fig. 8. The form of magnet shown in Fig. 9 is a cylinder identical with one of the magnets $5_1$ or $5_2$ or $5_3$ (for example) of Fig. 8, but of large diameter and made with a central opening; that is to say the opposite faces of the annulus are magnetised north and south respectively and carry the annuli and claws of soft iron which give the polar distribution. Nothing is changed in principle if the ratio of the diameters of annulus and its central opening is changed, and the opening may even be suppressed the magnet being then reduced to a more or less flat cylindrical stud, like those of Fig. 8, or like the draughtsmen in a game of draughts, with two discs of soft iron on its polar faces having radial extension or claws, two in number, that is to say bi-polar as in Fig. 4, or to the number of six as in Fig. 9.

There is shown in Fig. 10, solely by way of example, a means of transforming the oscillations of the balance wheel into rotation of the hands in which, at each swing of the balance wheel in passing through its position of equilibrium, the wheel advances the ratchet escapement wheel one tooth. The balance wheel 6 is fixed to a small cam 16, which, when the wheel passes the equilibrium position, raises a member 17 pivoted at 0, and the pawl 24 being operative, advances the wheel R by one tooth. The retaining pawl 23 prevents backward rotation when the cam is not in contact with the member 17 and this member returns to its position of rest against the abutment 22 under the action of spring 21. On the reverse swing of the wheel the other flank of the movable and fixed cams comes into play. The ratchet wheel R drives through reduction gearing the minute hand $mi$, and this, through the usual train (cannon pinion, minute wheel, minute wheel pinion, hour wheel) moves the hour hand H. Where the case does not strictly limit the thickness of the movement it is preferable to employ the known system of worm and two bevel wheels by which the first wheel of the clock train may be moved half tooth by half tooth.

In Figs. 11 and 12 there is a single-acting effect, that is to say attraction only, while Figs. 1 to 6 are double-acting using both attraction and repulsion. In Figs. 11 and 12 the windings 1 and 1' are in the form of flat circular cakes, and the position shown is that which corresponds to the instant of contact making on the axis of the position of unstable equilibrium. Both coils tend to embrace the maximum polar flux so that the spontaneous swinging which maintains the balance wheel in oscillation takes place in one sense or the other according to the sense impressed on the system starting from this symmetrical position, that is to say in the same sense as the swing of the balance wheel.

Figs. 13 and 14 show an improvement in which there is a magnetic flux between two magnets, preferably of bar from, in a narrow airgap indicated at 25, into which enters a little coil 26 of very fine wire carried at the periphery of the plate 27 on which the motor windings 1 are mounted. The coil 26 being so placed that it can enter the airgap 25 on the axis of the position of equilibrium, that is to say when the balance wheel is at maximum speed, at each passage the coil will be subjected to an increasing and decreasing flux of rectangular wave form which will generate two electromotive forces of peak form and opposite sign which can be used for regulating amplitude after passage, if necessary, through a dry rectifier since their value is proportional to the angular speed. The induced electromotive force could also be used in the input circuit of an amplifier normally practically cut off and made conductive by the induced E.M.F. generated in the coil 26, the output circuit of the amplifier 31 (Fig. 14), provided with a battery 32 and directly supplying the windings 1 and 1' of the micro motor so avoiding any mechanical contact. One alternation is suppressed, and the alternation corresponding to decrease of flux in the coil is chosen so that the motive pulse occurs after passage of the neutral line of unstable equilibrium. It has already been proposed to use crystal amplifiers to maintain the oscillation of a balance wheel and the present improvement concerns only the combination of such amplifier with the double-acting magneto electric motor described having elongated tapered magnets.

Figs. 15 and 16 show a construction in which the two windings 1 and 1' are of triangular form as in Fig. 3. The action is the same as in Fig. 1, except that the two bar magnets 3 and 3' are movable together.

Fig. 17 is a construction in which the magnet 28 is a disc or washer having north and south poles on opposite sides of a diameter, and opposite two triangular windings; the figure shows the position of unstable equilibrium at which contact is made.

In Fig. 18 there is shown a moving magnet 3 between two pairs of coils 1—1' and $1_a$—$1_b$, the arrows indicating the direction of flux through the coils to give the desired effect of repulsion at the ends of the magnet.

I claim:

1. A small magneto-electric motor for driving a clockwork, comprising a balance wheel, a spindle carrying said wheel, a spiral return spring, a flat winding and two permanent magnets arranged either side of said winding and having their poles of opposite sign facing each other, whereby the magnetic flux between them is at right angles to the plane of the winding and parallel to the axis of the spindle, one of the two elements of the motor, said winding and said magnets, being carried by said balance wheel, said winding comprising two pairs of radially arranged flat bundles of rectilinear conductors, one bundle of each pair being in substantial alignment with one bundle of the other pair, means to supply to said winding current impulses of constant direction once during each half oscillation of the balance wheel when the diameter of the wheel bisecting the opposite angles formed by said pairs of bundles substantially coincides with the longitudinal axis of symmetry of the permanent magnets, and connecting means between said bundles which are arranged so that the direction of the current fed to said winding is the same in two radially aligned bundles of said pairs respectively and opposite in the other two bundles of each pair, said direction of current fed to the winding being such that the fluxes generated by two opposite triangular parts of the winding respectively are opposite to the fluxes flowing through said parts of the winding due to the permanent magnets.

2. A small magneto-electric motor for driving a clockwork comprising a balance wheel, a spindle carrying said wheel, a spiral return spring, a flat winding and two flat permanent magnets arranged either side of said winding and having their poles of opposite sign facing each other, whereby the magnetic flux between them is at right angles to the plane of the winding and parallel to the axis of the spindle, one of the two elements of the motor, winding and magnet, being carried by said balance wheel, said winding comprising two flat substantially triangular coils having opposite apices adjacent to each other and to the spindle, the sides of the said opposite apices arranged along the radii of the balance wheel being in substantial alignment respectively, means to supply to said winding current impulses of constant direction once during each half oscillation of the balance wheel when the longitudinal axis of symmetry of the winding substantially coincides with that of the magnet, the direction of the current fed to the winding being such that the direction of the current in the aligned sides of the triangles is the same and that the fluxes generated by the two triangular parts of the winding respectively are opposite to each other and to the fluxes flowing through said parts of the winding due to the permanent magnets.

3. A magneto electric motor for driving a clockwork having a balance wheel and spiral spring, comprising a winding consisting of two flat substantially triangular coils having opposite apices adjacent to each other and to the spindle, the sides of the said opposite apices arranged along the radius of the balance wheel being in substantial alignment respectively, a rotatable spindle at right angles to the plane of the winding located between the two apices, means securing the winding upon said spindle to form a balance wheel, two groups of magnets, the one exactly opposite the other, arranged on either side of the winding, each group including a central bar magnet having poles of substantially triangular form, each pole of the one group being of opposite sign to the pole of the other group facing it, two auxiliary magnets located with their north poles adjacent to the south pole of the central magnet and their south poles adjacent to the north poles of the central magnet, and means for injecting into said winding at the instant when its axis of symmetry substantially coincides with that of the magnets a current impulsion of such direction that the flux due to each of the two parts of the figure of eight winding is of opposite direction to the flux through that part due to the magnets.

4. A small magneto-electric motor for driving a clockwork comprising a balance wheel, a spindle carrying said wheel, a spiral return spring, a flat winding and two flat permanent magnets arranged either side of said winding and having their poles of opposite sign facing each other, whereby the magnetic flux between them is at right angles to the plane of the winding, and parallel to the axis of the spindle, one of the two elements of the motor, winding and magnet, being carried by said balance wheel, said winding comprising two pairs of radially arranged flat bundles of rectilinear conductors, one bundle of each pair being in substantial alignment with one bundle of the other pair and being connected in series therewith, whereas the outer ends of said radially arranged bundles of each pair are connected with one another to form two substantially triangular coils, the magnetic fluxes of which have opposite directions, means to supply to said winding current impulses of constant direction once during each half oscillation of the balance wheel when the longitudinal axis of symmetry of the winding substantially coincides with that of the magnet, the direction of the current fed to the winding being such that the fluxes generated by the two triangular parts of the winding respectively are opposite to the fluxes flowing through said parts of the winding due to the permanent magnets.

5. A magneto-electric motor for driving a clockwork having a circular balance wheel and a spiral return spring, comprising a winding consisting of two pairs of radially arranged flat bundles of rectilinear conductors, one bundle of each pair being in substantial alignment with one bundle of the other pair, connecting means between said bundles which are arranged so that the direction of the current fed to said winding is the same in two radially aligned bundles of said pair respectively and opposite in the other two bundles of each pair, means securing the winding upon said spindle to form a balance wheel, a group of magnets arranged on one side of said winding including a central bar magnet having poles of substantially triangular form and two auxiliary magnets located with their north poles adjacent to the south pole of the central magnet and their south poles adjacent to the north pole of the central magnet, a flat soft iron plate arranged on the other side of said winding of substantially rectangular form having slots therein substantially dividing it into three parallel limbs, the middle limb being interrupted at the middle for passage of the spindle, and means for injecting into said winding at the instant when its axis of symmetry substantially coincides with that of the magnets a current impulsion of such direction that the flux due to each of the two parts of the figure of eight winding is of opposite direction to the flux through that part due to the magnets.

6. A magneto-electric motor for driving a clockwork having a circular balance wheel and a spiral return spring, comprising a winding consisting of two pairs of radially arranged flat bundles of rectilinear conductors, one bundle of each pair being in substantial alignment with one bundle of the other pair, connecting means between said bundles which are arranged so that the direction of the current fed to said winding is the same in two radially aligned bundles of said pairs respectively and opposite in the other two bundles of each pair, means securing said winding upon the balance wheel, at least one magnet system consisting of an odd number of pairs of small magnet blocks arranged in a circle concentric with the axis of rotation of the balance wheel and their magnetic axes parallel with said axis and of alternate polarity, said blocks being fixed by one end to a plate of soft iron, and means for injecting current impulses into the winding at the instant when the geometrical axis of the winding coincides with that of the magnet, the direction of current in the winding being such that the flux due to the winding through the two parts of the figure of eight is opposite to the flux through those parts due to the magnets.

7. A magneto-electric motor for driving a clockwork having a circular balance wheel and a spiral return spring, comprising a winding consisting of two pairs of radially arranged flat bundles of rectilinear conductors, one bundle of each pair being in substantial alignment with one bundle of the other pair, connecting means between said bundles which are arranged so that the direction of the current fed to said winding is the same in two radially aligned bundles of said pairs respectively and opposite in the other two bundles of each pair, means securing said winding to the balance wheel, a magnet system comprising an annular magnet with flat parallel faces concentric with the axis of the balance wheel, two flat rings of soft iron fixed on said flat faces and having tongues projecting from their inner edges to form pole pieces, the tongues upon the one ring being straight and those upon the other bent to lie with their ends in the same plane as the straight tongues, means for injecting current impulsions into the winding at the instant when the geometrical axis of the winding coincides with that of the magnet, the direction of current in the winding being such that the flux due to the winding through the two parts of the figure of eight is opposite to the flux through those parts due to the magnets.

8. A magneto-electric motor for driving a clockwork having a circular balance wheel and a spiral return spring, comprising a winding consisting of two pairs of radially arranged flat bundles of rectilinear conductors, one bundle of each pair being in substantial alignment with one bundle of the other pair, connecting means between said bundles which are arranged so that the direction of the current fed to said winding is the same in two radially aligned bundles of said pairs respectively and opposite in the other two bundles of each pair, two permanent magnets arranged on opposite sides of said winding with an airgap between them produce a flux at right angles to the plane of the winding, each pole of the one magnet being opposite in sign to the pole of the other magnet facing it, a rotatable spindle at right angles to the plane of the winding passing through the center of symmetry of the winding, one of the two elements of the motor namely winding and magnet being secured to said spindle to form a balance wheel, means for injecting into the winding at the instant when the geometrical axis of symmetry of the winding substantially coincides with that of the magnet current impulsions of such direction that the flux due to the winding through the two parts of the figure of eight is of opposite sign to the flux through those parts due to the magnet, and an amplitude regulator for the balance wheel comprising a coil of fine wire symmetrically secured upon the balance wheel with respect to its geometric axis of symmetry, and adapted to enter the airgap between the magnets and to produce a retarding torque.

9. A magneto-electric motor for driving a clockwork having a circular balance wheel and a spiral return spring, comprising a winding consisting of two pairs of radially arranged flat bundles of rectilinear conductors, one bundle of each pair being in substantial alignment with one bundle of the other pair, connecting means between said bundles which are arranged so that the direction of the current fed to said winding is the same in two radially aligned bundles of said pairs respectively and opposite in the other two bundles of each pair, two permanent magnets arranged on either side of said winding with an airgap between them to produce a flux at right angles to the plane of the winding, each pole of the one magnet being opposite in sign to the pole of the other magnet facing it, a rotatable spindle at right angles to the plane of the winding passing through the center of symmetry of the winding, one of the two elements of the motor namely winding and magnet being secured to said spindle to form a balance wheel, means for injecting into the winding at the instant when the geometrical axis of symmetry of the winding substantially coincides with that of the magnet current impulsions of such direction that the flux due to the winding through the two parts of the figure of eight is of opposite sign to the flux through those parts due to the magnet, an amplitude regulator for the balance wheel comprising a coil of fine wire secured upon the balance wheel symmetrical with respect to its geometrical axis of symmetry, and adapted to enter the airgap between the magnets and an amplifier of small power consumption of the transistor type, means for connecting said amplifier to said coil of fine wire, and means for supplying the output of said amplifier to the motor winding.

10. A motor according to claim 1, wherein the magnet is carried by the balance wheel and is formed by a disc magnetized to have opposite polarities either side of a diameter, said disc being arranged in a closed vicinity of the winding.

11. A small electric motor according to claim 1 wherein a bar of alloy at its Curie point is arranged upon at least one of the permanent magnets to compensate for the effect of temperature changes.

No references cited.